United States Patent [19]

Pomeranz et al.

[11] Patent Number: 4,471,538
[45] Date of Patent: Sep. 18, 1984

[54] SHOCK ABSORBING DEVICES USING RHEOPEXIC FLUID

[76] Inventors: Mark L. Pomeranz, 9760 Viceroy Dr. East, Jacksonville, Fla. 32217; R. Saul Levinson, 26 Carriage La., West Milford, N.J. 07480

[21] Appl. No.: 388,549

[22] Filed: Jun. 15, 1982

[51] Int. Cl.$^3$ .................... A43B 13/18; A41D 19/00; F16F 5/00; B68C 1/00; B62J 1/00
[52] U.S. Cl. .......................... 36/28; 36/43; 188/322.5; 2/159; 54/41; 297/214
[58] Field of Search ................ 36/28, 29, 35 A, 35 B, 36/71, 43; 128/594; 560/151; 188/322.5; 2/19, 159

[56] References Cited

U.S. PATENT DOCUMENTS

| | | | |
|---|---|---|---|
| 2,028,091 | 1/1936 | Jaeger | 560/151 |
| 2,546,827 | 3/1951 | Lavinthal | 128/595 |
| 3,237,319 | 3/1966 | Hanson | 36/71 |
| 3,871,496 | 3/1975 | Wigal | 188/322.5 |
| 4,115,934 | 9/1978 | Hall | 36/29 |
| 4,182,441 | 1/1980 | Strong et al. | 188/322.5 |
| 4,211,236 | 7/1980 | Krinsky | 128/594 |
| 4,342,157 | 8/1982 | Gilbert | 128/594 |
| 4,366,579 | 1/1983 | Noguchi | 2/19 |
| 4,432,357 | 2/1984 | Pomeranz | 128/132 R |

OTHER PUBLICATIONS

Appearance of Myelin Forms in Rheopexic Dispersions of Dioctyl Sodium Sulfosuccinate, Journal of Pharmaceutical Sciences, Levinson et al., vol. 65, No. 8, Aug. 1976, pp. 1265-1266.

Effect on pH on Rheopexic Dispersions of Dioctyl Sodium Sulfosuccinate Dispersed in Normal Saline, Journal of Colloid & Interface Science, Levinson et al., vol. 72, No. 1, Oct. 15, 1979, pp. 159-160.

Rheological Characterization of Dioctyl Sodium Sulfosuccinate in Normal Saline and Distilled Water, Journal of Colloid & Interface Science, Levinson et al., vol. 56, No. 2, Aug. 1976, pp. 388-390.

Primary Examiner—Werner H. Schroeder
Assistant Examiner—Steven N. Meyers
Attorney, Agent, or Firm—Frishauf, Holtz, Goodman & Woodward

[57] ABSTRACT

Shock absorbing devices utilize rheopexic fluid contained in a deformable sealed chamber which is subjected to external shock forces. Upon application of the shock forces to the deformable sealed chamber, the rheopexic fluid filled therein is exerted with shear stress which causes the rheopexic fluid to increase its consistency and shock absorbent characteristics as a function of increasing shear stresses applied thereto. Additionally, when used in an application wherein the device is placed against a body part of a user, the rheopexic material "molds" itself to the body portion of the user. When left at rest, the rheopexic material returns to its initial fluid, low-consistency state.

17 Claims, 12 Drawing Figures

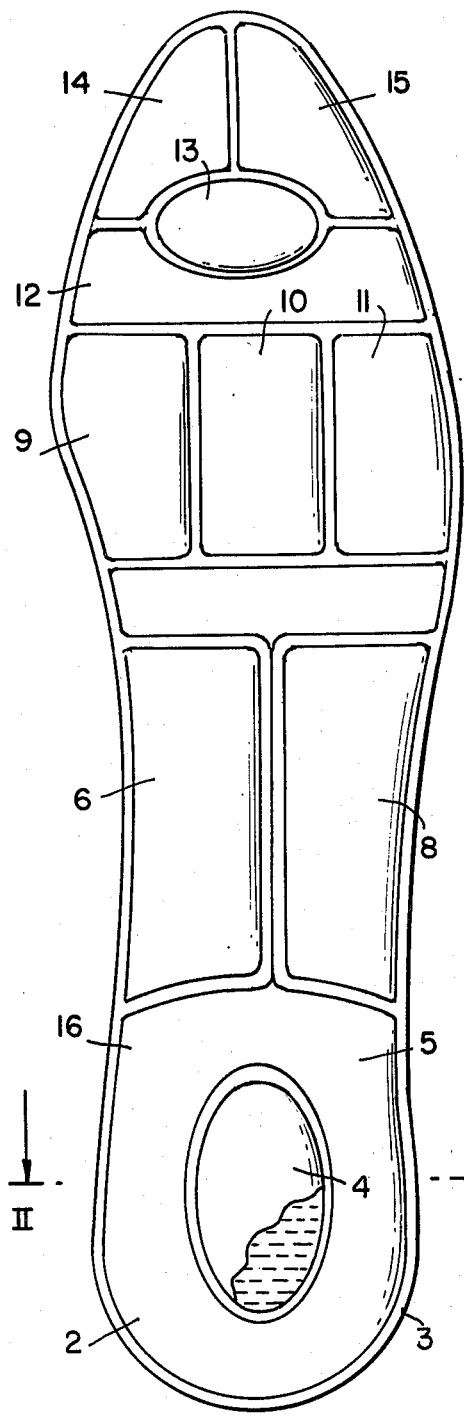
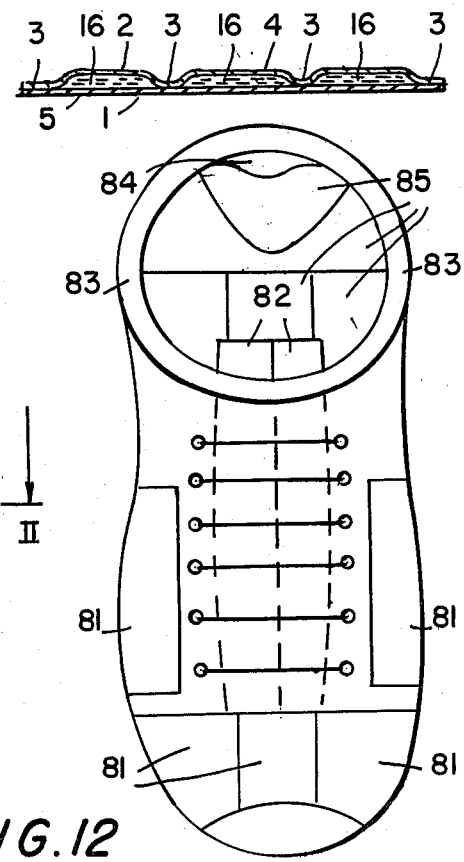
FIG. 1
FIG. 2
FIG. 12

SHOCK ABSORBING DEVICES USING RHEOPEXIC FLUID

BACKGROUND OF THE INVENTION

This invention relates to shock absorbing devices using rheopexic fluids, and more particularly to shock absorbing devices such as shoe inserts, shock absorbers for vehicular or other uses, bed tops, horse saddles, bicycle saddles, gloves or the like.

Rheopexic fluids are known. A discussion of rheopexic fluids is given hereinbelow to facilitate an understanding of the present invention.

A rheopexic fluid is a material which thickens with increasing shear stress and remains at the thicker consistency for a period of time before returning to the original consistency which is of a lower viscosity. The increase of thickness or viscosity results from application of shear stress which can be applied in the form of agitation which results from repeated applications of pressure and/or shock forces.

The object of the present invention is to provide shock absorbing devices using rheopexic fluid, which shock absorbing devices in various applications also conform themselves to given contours.

A further object of the invention is to provide a shoe insert or insole using a rheopexic fluid which not only provides shock absorbing characteristics, but which also conforms itself to the contours of the foot of the wearer. Similarly, an object is to provide a horse saddle, bicycle saddle, gloves and other devices using rheopexic fluids which conform themselves to body contours of the user during use, as well as provide shock absorbing characteristics. A further object of the invention is to provide a shock absorber for use on vehicles or other devices which contain rheopexic fluid in a piston and cylinder arrangement and which provides increasing shock absorbing characteristics with increasing application of shocks to the device.

SUMMARY OF THE INVENTION

According to the present invention, a shock absorbing device using rheopexic fluid comprises means defining at least one deformable sealed chamber which is subjected to external shock forces; and rheopexic fluid filled in said at least one deformable sealed chamber such that when said at least one deformable sealed chamber is deformed when subjected to an externally applied shock, shear stresses are exerted on said rheopexic material due to deformation of said at least one deformable sealed chamber to cause said rheopexic fluid to increase its consistency and shock absorbent characteristics as a function of increasing shear stresses applied thereto.

In a preferred embodiment, the shock absorbing device comprises a plurality of such deformable sealed chambers adjacent to each other, each of the deformable sealed chambers containing said rheopexic material. This type of arrangement is particularly useful for shoe inserts, horse saddles, bicycle saddles, gloves, bed tops and the like.

According to a further preferred embodiment, a shock absorber for vehicular use or other uses comprises a deformable sealed chamber having at least one movable wall portion which is movable upon application of shock forces, and a constriction internally thereof and through which the rheopexic material passes upon movement of the at least one movable partition member. Upon movement through the constriction, the rheopexic material is subjected to shear stress which increases its thickness and increases the shock absorbing characteristics of the shock absorbing device. Even though the sealed chamber in a vehicular-type shock absorber is made of rigid materials, it is "deformable" within the meaning of the present invention to the extent that it has a movable wall portion (or partition) which changes or "deforms" the interior size and/or shape of the sealed chamber.

BRIEF DESCRIPTION OF THE DRAWINGS

FIG. 1 is a top view of a removable shoe insert according to the present invention;

FIG. 2 is a section view taken along line II—II in FIG. 1;

FIG. 12 illustrates a shoe having rheopexic fluid-containing chambers in the uppers thereof, in accordance with the present invention.

DETAILED DESCRIPTION

Figure 3:
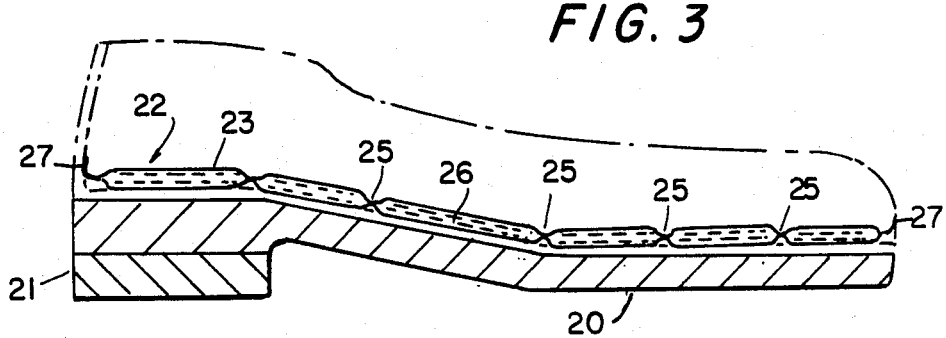
FIG. 3 is a part-sectional view showing the invention as applied to a shoe having a shock absorbing and foot conforming device of the present invention as an integral part thereof.

The rheopexic fluid used in the invention is preferably an aqueous solution of a dialkyl sulfosuccinate salt of the formula

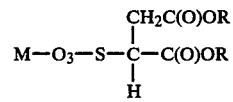

wherein R is an alkyl group containing 6 to 12 carbon atoms and preferably 8 to 12 carbon atoms with the octyl (e.g., 2-ethylhexyl) group being particularly preferred. M is a Group IA ion and preferably sodium, potassium or lithium, with sodium being particularly preferred. The 1,4-bis(2-ethylhexyl) sodium sulfosuccinate is the most preferred compound.

The aqueous solution is preferably a Normal saline solution (0.9 gram of sodium chloride in 100 milliliters of water) or a Ringer's solution (0.86 gram sodium chloride, 0.03 gram potassium chloride and 0.33 gram calcium chloride in 100 milliliters of water). These solutions are referred to as physiological electrolyte solutions or commonly physiological solution.

The solutions can contain from about 0.7 to 1.3 grams of the salt per 100 milliliters of water and preferably between about 0.8 and 0.10 grams. The range of between about 0.85 and 0.95 grams per 100 milliliters is particularly preferred.

The dialkyl (e.g., the 1,4-bis(2-ethylhexyl) sulfosuccinate salt is dissolved in the physiological solution in an amount between about 15 and 200 grams per 100 milliliters of solution and preferably in an amount between about 19 and 100 grams. The range of between about 19 and 65 grams is particularly preferred.

The rheopexic solution should have a pH of at least about 4 to exhibit the desired rheopexic characteristics. It preferably has a pH of at least about 5, with the range between about 5 and 7 being preferred. The effect of pH on rheopexic dispersions of dioctyl sodium sulfosuccinate in Normal saline are disclosed in an article by Levinson, Allen and Diagle in the Journal of Colloid and Interface Science, Vol. 72, No. 1, Oct. 15, 1979, pages 159-160.

Other characteristics of rheopexic dispersions of dioctyl sodium sulfosuccinate are disclosed in the Levinson, Allen and Diagle article in the Journal of Colloid and Interface Science, Vol. 56, No. 2, August 1976, pages 388-390, and in the Levinson, Allen, Vishnupad and Ecanow article in the Journal of Pharmaceutical Sciences, Vol. 65, No. 8, August 1976, pages 1265-1266.

The rheopexic solutions can be prepared by dissolving the dialkyl sulfosuccinate salt in the physiological solution. The salt may be in the form of a solid or in the form of a dispersion or solution in water or a water mixture, such as a water alcohol or water glycol mixture.

The preferred source of sodium dioctyl sulfosuccinate are the AEROSOL OT surfactants marketed by American Cyanamid. The preferred product is AEROSOL OT 100 which is a waxy solid sodium dioctyl sulfosuccinate. The OT 75 which contains about 75% of the solid salt and 25% of a mixture of water and alcohol and the OT 70 PG which contains about 70% of the solid salt with the remainder a mixture of water and propylene glycol also have provided useful rheopexic fluids when dissolved in the physiological solution.

The rheopexic effect is obtained over a wide temperature range between freezing and boiling with the range of 1.5° C. to 100° C. being preferred and the range of 1.5° C.-29° C. being particularly preferred.

The gel viscosity attained and the time during which the gel will remain in gel form after the applied stress is removed varies with the particular sulfosuccinate salt form used to prepare the rheopexic solution. A rheopexic solution prepared from OT-100 (100% solid salt) (1) attains a higher viscosity than a rheopexic solution prepared frm OT-75, and (2) retains its gel viscosity for a longer time after the applied stress is removed.

The rheopexic fluid used in the embodiments exemplified herein was prepared by dissolving 19 parts by weight of solid powdery sodium 1,4-bis(2-ethylhexyl) sulfosuccinate (AEROSOL OT-100) in 100 ml. of Normal saline solution.

The rheopexic fluid described above is used in accordance with the present invention in devices such as shoes, shoe inserts, shock absorbers for vehicles or other uses, horse saddles, bicycle saddles, gloves (especially for work with vibrating tools or bicycle gloves), bed tops, and other like devices where shock and contour conformance are considerations. These applications of the rheopexic material are discussed in detail hereinbelow.

Referring to FIG. 1, a removable shoe insert is illustrated, the shoe insert being comprised of two flexible layers 1, 2 defining a plurality of deformable sealed chambers 4-15 therebetween, rheopexic fluid 16 being contained in said deformable sealed chambers 4-15. The lower layer 1 and the upper layer 2 are, for example, made of plastic material and are heat sealed together at portions 3 to define the deformable chambers 4-15. The shoe insert of FIG. 1 is removably placed inside of a shoe, like other shoe inserts such as foam rubber inserts or the like.

The rheopexic fluid is initially of low viscosity, but after the user inserts his foot into the shoe with the shoe insert of FIG. 1 inserted inside the shoe, the agitation of the fluid caused by the user's walking or other activity, exerts shear stress on the rheopexic fluid which causes the rheopexic material to thicken to a higher viscosity and effectively "mold" itself to the contours of the foot of the user. When the rheopexic fluid thickens, it also acts as a shock absorber, increasing the user's comfort.

Upper and lower layers 1, 2 are made of a strong, flexible and tear resistant material, such as a polymeric plastic material, etc. The upper layer may have a small degree of elasticity so that it may better conform to the contours of the foot of the wearer and apply shear stress to the rheopexic fluid during the user's activity.

FIG. 3 illustrates a part-sectional view of a shoe which fixedly or permanently incorporates the insert of FIGS. 1 and 2. In FIG. 3, the configuration of the sealed chambers is somewhat different from the configuration illustrated in FIGS. 1 and 2, but the particular configuration of sealed chambers is not considered critical. Various modifications can be made in the size, shape, etc. of the sealed chambers of the insole of the present invention.

As shown in FIG. 3, the shoe comprises a sole 20 and heel 21, as is conventional. The shoe also comprises an insole 22 fabricated in accordance with the techniques of FIGS. 1 and 2. The insole 22 comprises upper and lower layers 23, 24, which are sealed together at, for example, portions 25 to provide deformable sealed chambers 26, each of which contain rheopexic fluid, in a manner similar to the chambers of FIGS. 1 and 2. The upper layer 23 is preferably formed of a flexible plastic material of the same type as used in FIGS. 1 and 2. The flexible plastic material in FIGS. 1-3 may be covered, for example, with a felt-like material or other cushiony material to increase comfort for the user.

The lower layer 24 may be omitted and the upper surface of the sole 20 and heel 21 can serve as the lower layer 24, if they are fabricated from waterproof materials, and if they are sealable to the upper layer 23 to define the respective chambers 26. The shoe also preferably has a surrounding member which is upstanding from the sole 20 and heel 21 to better retain the insole member 20 therein. The upstanding member 27 can be in the interior of the shoe and covered by the decorative leather or other outer material of the shoe, as desired.

In use, the shoe with the permanently installed insole or the shoe insert of the present invention which contains the rheopexic fluid in sealed chambers not only forms or "molds" itself to the contours of the foot during use (caused by agitation of the fluid), but it also provides increasing shock resistance and support as the level of foot activity increases, due to increased thickening of the fluid (as a result of increased shear stress applied thereto). The shoe insole of the present invention is particularly useful for jogging shoes, gym shoes and other types of athletic footwear wherein there is a high degree of foot activity and the shock absorbing characteristic is particularly advantageous.

The shoe of FIG. 3, or the shoe inserts of FIGS. 1 and 2, are also particularly advantageous for use in orthopedic shoes since the bottom portion of the shoe will "mold" itself to the foot contour of the user, during use. For example, if the user has bunions, etc., the shoe insole will mold itself perfectly around them to increase confort. Or, if swelling or blisters change the shape of the foot daily, the rheopexic material, after a short period of time of non-use, reverts back to the less viscous solution form and is remoldable again to conform itself to the contour of the foot of the user during the next use (due to application of shear stress during walking, running or the like). The rheopexic material in the shoe inserts or insoles of the present invention also conforms to various structural irregularities in the foot of the user, further increasing comfort.

In some cases, the shoe insert can assume the configuration of a heel portion alone, a sole portion alone, or any other shape or configuration to cooperate with any desired portion of the foot. Still further, the shoe insert of the present invention can be built into the sides and/or tops of the shoes so that if the wearer has some type of bone abnormality, or other defect in his foot, the insert would cushion, mold to, and provide shock absorbent protection for the irregular or otherwise affected portion of the foot. If the insert is to be built into the sides and/or top of the shoe, it can still take the general configuration shown in FIG. 1, but arranged and secured to the various shoe portions, as desired. An illustration of such a construction is shown in FIG. 12.

As shown in FIG. 12, sealed chambers 81 may be provided around the uppers of the shoe, and sealed rheopexic fluid-containing chambers can be formed in the tongue of the shoe, as shown at 82. Still further, a rheopexic fluid-containing chamber 83 can be provided around the opening of the shoe, and a rheopexic fluid-containing chamber 84 may be provided at the rear portion of the shoe to provide better cushioning, for example in jogging shoes. In addition to the chambers in the uppers, as described above, chambers 85 may be provided on the heel and/or sole portions of the shoe, as described in connection with FIGS. 1-3. The sizes of the chambers in FIG. 12 are exemplary, and may be varied as desired.

The illustrations in FIGS. 1-3 are not necessarily to scale. For example, the shoe insert or shoe insole of the present invention is preferably about ½ inch thick for best cushioning or shock absorbing effects. However, the insert or insole can be approximately ⅛ inch thick, or more than ½ inch thick, depending upon particular requirements of the user.

Figure 4:
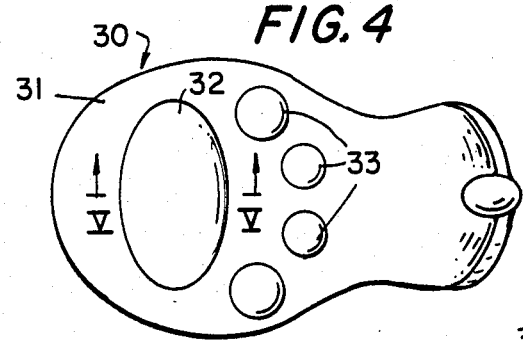
FIGS. 4 and 5 are views showing the invention applied to a horse saddle or cushion for, for example, a vehicle.

FIG. 4 is a view showing the invention applied to a horse saddle. A similar configuration, but made in a flat form, could be used for a seat cushion for a vehicle or any other application where shock and contour conformance characteristics are desirable.

FIG. 4 illustrates a horse saddle embodying the present invention. The horse saddle 30 has a seating surface 31 which has a plurality of deformable sealed chambers 32, 33 on the upper surface thereof. The sealed chambers may be fabricated in a manner similar to that shown in FIGS. 1-3. The upper surface of sealed chamber 32 is fabricated of a deformable material, such as plastic or other waterproof material, which is sealed to the bottom surface 35 (FIG. 5) of the horse saddle at, for example, 36. A heat seal or other adhesive seal can be used, depending upon materials. Chamber 32 is filled with rheopexic material 37. The rear chamber 32 is relatively large to support the buttocks of the user, and the forward chambers 33 are smaller and support and protect the leg portions of the user. During use, the vibration which results from the up-down motion of the horse and rider, produces shear stress in the rheopexic fluid in the chambers 32, 33, thus increasing the viscosity thereof, and increasing the shock absorbent characteristic as a function of increasing application of shear stress. The rheopexic material also tends to conform to the body contour of the user, thereby increasing comfort.

Figure 5:
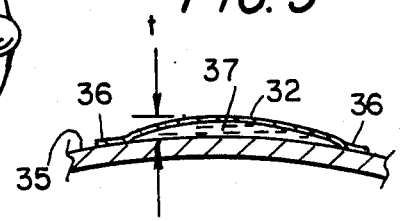

In the horse saddle of FIGS. 4 and 5, the thickness of the chamber in the direction "t" in FIG. 5 is preferably approximately one inch. However, other thicknesses can be used, as desired.

Figure 6:
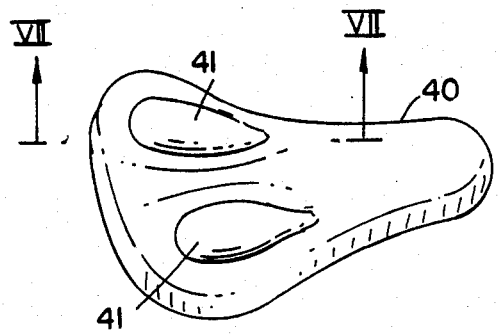
FIGS. 6 and 7 show a bicycle saddle of the present invention.

FIG. 6 shows a bicycle saddle embodying the present invention. The bicycle saddle 40 has a pair of deformable sealed chambers 41 formed therein, each chamber 41 containing rheopexic material. In section, the chambers 41 may be made similar to the chamber 32 illustrated in FIG. 5. The sealed chambers 41 are located in the buttock area of the bicycle rider since this is the area which requires most shock absorbence and deformability to the body contour. Other areas of the seat may be provided with rheopexic fluid containing chambers, as desired. Preferably, in a bicycle seat, the thickness of the chambers 41 in the direction "t" in FIG. 5 is also approximately one inch, although other thicknesses can be used.

Figure 7:
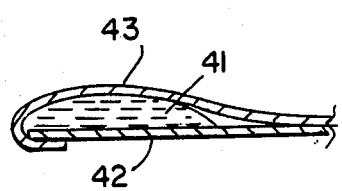

It should be clear that the horse saddle of FIGS. 4 and 5 and the seat cushion of FIG. 6 may have the rheopexic fluid containing chambers formed inernally thereof, and the outer surfaces thereof covered with a leather material or other suitable covering materials, for example, as shown in FIG. 7. As seen in FIG. 7, the seat 40 comprises an internal shell 42 made, for example, of rigid or semi-rigid plastic material, and a sealed chamber 41 mounted thereon. The sealed chamber may be individually formed in the shape of a sealed sack containing rheopexic fluid, or may be formed directly on shell member 42, as desired. The entire seat is then covered with a leather-like material 43 in a conventional manner.

Figure 8:
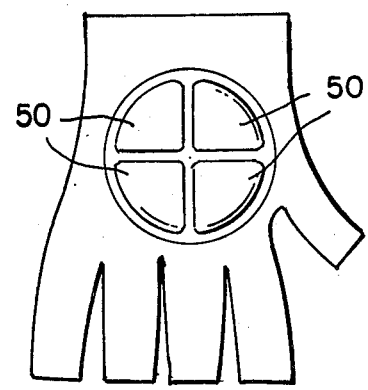
FIG. 8 shows a glove fabricated in accordance with the present invention.

FIG. 8 illustrates a glove embodying the present invention. For ease of description, only the palm portion of the glove is described. The palm portion of the glove of FIG. 8 has a plurality of sealed chambers 50 formed therein, each sealed chamber 50 being filled with rheopexic material of the present invention. The sealed chambers 50 are made of deformable material so that shocks applied to the palm portion of the glove produce shear stress in the rheopexic material contained in the chambers 50. The chambers 50 may be integrally formed on the glove, for example by means similar to that shown in FIGS. 1 and 2, or may be an insert applied to the inner portion of the glove, or even may be an attachment to the outer surface of the glove, as desired. A glove containing the shock absorbing material of the present invention is particularly suitable for use as a bicycle riding glove (to absorb road shocks), a glove for use with pneumatic or other vibrating machinery or tools, or any other use where a shock absorbing characteristic and conforming characteristic is desirable.

Figure 9:
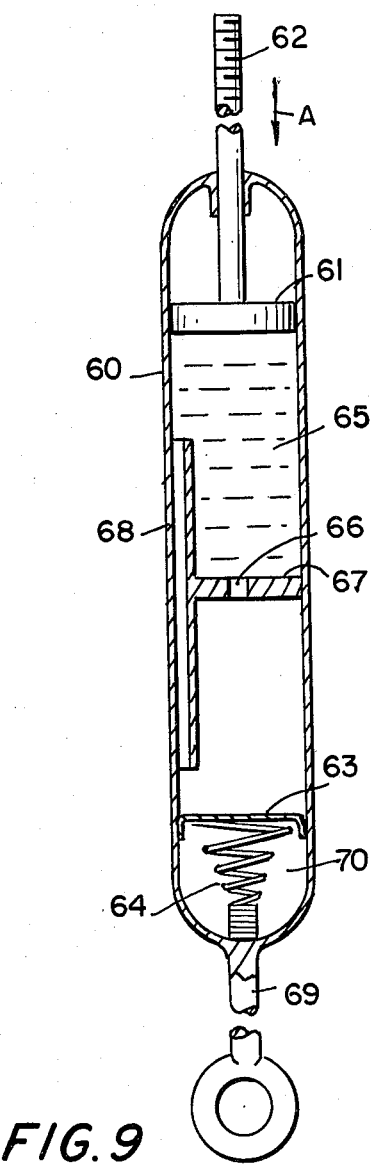
FIG. 9 is a sectional view of a shock absorbing device for vehicular or other uses according to the present invention.

FIG. 9 is a sectional view of a shock absorber fabricated in accordance with the present invention, which is particularly useful on automobiles or other vehicles. The shock absorber comprises a cylindrical member 60 having a piston 61 slideably mounted therein, the piston being connected to a rod 62 which is connected, for example, to a vehicle suspension member. The lower end of the cylindrical member 60 has a moveable diaphragm-like member 63 which is spring biassed in the upward direction by means of spring 64. Rheopexic fluid is contained within the space 65, as indicated in the Figure. Approximately midway between the piston 61 and diaphragm 63 is a fixed diameter orifice 66, defined by, for example, a partition member 67 mounted in cylindrical member 60 and having an aperture formed therein. The device also comprises a fluid return duct (for example in the form of a return pipe) extending between the lower and upper portions of the space 65, the orifice 66 being located between the upper and lower ends of the return duct 68. The cylindrical member 60 is attached to another portion of the vehicle suspension, for example by means of bushing 69 formed at the lower end thereof.

In use, when the vehicle suspension is subjected to shocks between rod 62 and bushing 69, which causes rod 62 to move downwardly in the direction of the arrow A relative to the cylindrical member 60, rheopexic fluid contained in chamber 65 is forced through the orifice 66, thereby applying shear stress to the rheopexic fluid flowing through the orifice 66. This increases the viscosity of the fluid in the chamber 65 and increases resistance to flow of the fluid through the fixed orifice 66. As a result, increasing shock absorbing characteristics are achieved. Since the rheopexic fluid is substantially non-compressible, the moveable spring-loaded diaphragm 63 at the bottom portion of the chamber moves downwardly responsive to downward movements of the piston 61 under influence of applied shock. A dead space 70 is provided below the diaphragm 63 to provide sufficient room for it to move under operation of the shock absorber.

The return duct 68 is provided to return fluid from the lower portion of the chamber 65 (below orifice 66) to the upper portion of chamber 65 (above orifice 66), when the piston 61 and associated rod moves in the upward direction relative to cylindrical member 60, as seen in FIG. 9.

The advantage of the shock absorber described above is that a complex valving system is not required. Moreover, the shock absorber self-adjusts to varying demands, in use.

In a preferred embodiment, the cylindrical member 60 has a length of approximately 10 inches, and an inner diameter of 1½ inches. The orifice 66 may be round and have a diameter of about 1-3.5 mm, and the duct 68 may have a cross-sectional diameter within the range of 1-3.5 mm. In some instances, it may be desirable that the return duct 68 have a larger cross-sectional area than the orifice 66. The return duct 68 may be located anywhere within the cylindrical member 60, as shown in FIG. 9, for example, or may be located externally of the cylinder 60, the open ends of the return duct 68 communicating with the interior of the cylinder 60 approximately a few inches above and below the orifice 66.

In the preferred embodiment of the shock absorber, the rheopexic fluid preferably has approximately 0.85 to 0.95 grams of salt per 100 milliliters of water. A more preferable range is between about 0.85 and 0.9 grams of salt per 100 milliliters of water. In these preferred ranges, the rheopexic solution has a characteristic of reforming very quickly to the original viscosity state after application of shear stress, and also has the characteristic of becoming very viscous very quickly upon application of shear stress. In operation of the shock absorber, a downward force applied to the piston in the direction of the arrow A in FIG. 9 creates very high shear stress in the upper space 65, and the fluid in this space becomes very viscous, especially as it passes through orifice 66. In the space within the cylinder below the orifice 66, the activity of the fluid is much lower and the rheopexic fluid quickly reforms to its less viscous state so that it can now more easily pass through the return duct 68 and through the orifice 66 responsive to an upstroke of the piston 61 so as to return the fluid to the upper space 65 during the upstroke of the piston 61. In this manner, highly efficient shock absorbing characteristics are achieved without complex valving systems which are required in conventional vehicular shock absorbers. Moreover, the shock absorber of the present invention self adjusts to varying demands.

Figure 10:
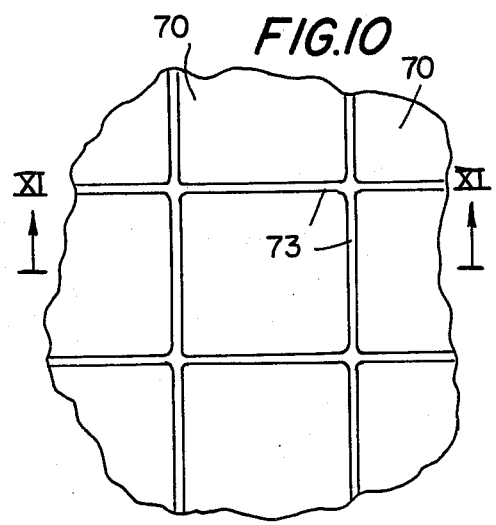
FIG. 10 is a top view of a bed top according to the present invention.
Figure 11:
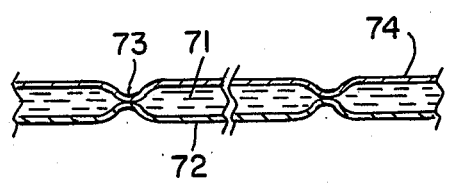
FIG. 11 is a sectional view thereof.

FIGS. 10 and 11 illustrate a bed top according to the present invention which can be placed on top of a mattress or other soft or resilient surface. The bed top comprises a plurality of sealed deformable chambers 70, each containing rheopexic material therein. The bed top comprises an upper flexible layer 71 (FIG. 11) and a lower flexible layer 72, the layers being sealed together, for example by heat sealing, at 73, in a similar manner as the shoe insole of FIGS. 1-3. Preferably, the layers 71 and 72 are of the same type of flexible plastic material as the shoe insert of FIGS. 1 and 2. The layers 71, 72 can be bonded together at 73 by other means, for example by suitable adhesives. For a bed top, the upper layer 71 is preferably laminated with a fabric or other type of material to improve comfort to the user. Such an outer covering 74 (FIG. 11) is more comfortable to lie on than plastic material. Alternatively, the bed top can be mounted in a sack or may be covered with a sheet or the like to further improve comfort.

Activity of the user on the bed top of the present invention imparts deformation to the sealed deformable chambers 70, and increases the viscosity of the rheopexic material contained therein due to resulting shear stress on the rheopexic material. This not only provides improved comfort, but also provides improved moldability of the bed top to the body contours of the user.

We claim:

1. A shock absorbing device using rheopexic fluid comprising:
    means defining at least one deformable sealed chamber which is subjected to externally applied shock forces; and
    rheopexic fluid having an original viscosity and being filled in said at least one deformable sealed chamber such that when said at least one deformable sealed chamber is subjected to the externally applied shock forces, shear stress is exerted on said rheopexic material in said at least one deformable sealed chamber due to deformation of said at least one deformable sealed chamber to cause said rheopexic fluid to increase its viscosity from its original viscosity and to thereby increase its shock absorbing characteristics with increasing shear stress applied thereto, said rheopexic fluid reverting back to its original lower viscosity after abatement of said shock forces and resultant shear stress.

2. The shock absorbing device of claim 1, comprising a plurality of said deformable sealed chambers adjacent to each other, each of said deformable sealed chambers containing said rheopexic material.

3. The shock absorbing device of claim 2, wherein said device is generally in the form of a shoe sole.

4. The shock absorbing device of claim 3, wherein said shoe sole is removably insertable in a shoe for cooperation with a foot portion of a user.

5. The shock absorbing device of claim 2 or 3, wherein said device is an integral part of a shoe and is arranged for cooperation with a foot portion of a user.

6. The shock absorbing device of claim 2, wherein said device is in the form of a horse saddle, and comprises at least one deformable sealed chamber in the area of the horse saddle receiving the buttocks of a user.

7. The shock absorbing device of claim 2, wherein said device is in the form of a bicycle saddle, and comprises at least one deformable sealed chamber in the area of the bicycle saddle receiving the buttocks of a user.

8. The shock absorbing device of claim 1, wherein the device is in the form of a glove, and said at least one deformable sealed chamber with said rheopexic fluid filled therein is in the palm portion of said glove.

9. The shock absorbing device of claim 8, comprising a plurality of said deformable sealed chambers adjacent each other in said palm portion of said glove, each of said deformable sealed chambers containing said rheopexic material.

10. The shock absorbing device of claim 1, in the form of a shock absorber for use on vehicles or the like, wherein said means defining said at least one deformable sealed chamber comprises means defining a rigid elongated member containing said rheopexic fluid therein; a piston member sealingly slideable in said elongated rigid member; a moveable diaphragm member in said elongated rigid member and arranged opposite said piston member with said rheopexic fluid located therebetween; means defining an orifice of reduced diameter in said elongated rigid member and located between said piston and said diaphragm; a fluid return duct means extending between portions of said elongated rigid member on both opposite sides of said orifice, and in communication with the interior of said elongated rigid member on both sides of said orifice.

11. The shock absorbing device of claim 10, wherein said orifice has a diameter of about 1–3.5 mm.

12. The shock absorbing device of claim 10 or 11, wherein said elongated rigid member is a substantially cylindrical member.

13. The shock absorbing device of claim 10, wherein said fluid return duct means comprises a pipe-like member interior of said rigid elongated member and extending between both opposite sides of said orifice.

14. The shock absorbing device according to any one of claims 2, 3, 6, 7, 8 or 9, wherein said deformable sealed chambers are substantially flat chambers.

15. The shock absorbing device of claim 14, wherein said deformable sealed chambers have nominal thickness or height of about ½ inch.

16. The shock absorbing device of claim 14, wherein said deformable sealed chambers have nominal thickness or height of about 1 inch.

17. The shock absorbing device of any one of claims 2, 3, 4 or 9, wherein said plurality of said deformable sealed chambers are sealed off from each other.

* * * * *